(12) United States Patent
Kitajima

(10) Patent No.: US 11,409,699 B2
(45) Date of Patent: Aug. 9, 2022

(54) DRIVE RECORDER OPERATION SYSTEM, DRIVE RECORDER, OPERATION METHOD, AND RECORDING MEDIUM FOR OPERATION

(71) Applicant: JVCKENWOOD Corporation, Yokohama (JP)

(72) Inventor: Shingo Kitajima, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 96 days.

(21) Appl. No.: 16/729,758

(22) Filed: Dec. 30, 2019

(65) Prior Publication Data

US 2020/0133918 A1 Apr. 30, 2020

Related U.S. Application Data

(63) Continuation of application No. PCT/JP2017/045865, filed on Dec. 21, 2017.

(51) Int. Cl.
| | |
|---|---|
| *G06F 7/00* | (2006.01) |
| *G06F 16/11* | (2019.01) |
| *G06F 16/18* | (2019.01) |
| *H04N 5/76* | (2006.01) |

(Continued)

(52) U.S. Cl.
CPC ........ *G06F 16/125* (2019.01); *G06F 16/1873* (2019.01); *H04N 5/76* (2013.01); *G07C 5/008* (2013.01); *G07C 5/04* (2013.01)

(58) Field of Classification Search
CPC ... G06F 16/125; G06F 16/1873; G07C 5/008; G07C 5/04; G07C 5/0866; G08B 13/19671; G08B 13/19673; G08B 13/19676; G08B 13/19669; H04N 5/76
See application file for complete search history.

(56) References Cited

U.S. PATENT DOCUMENTS 5,899,956 A * 5/1999 Chan ...................... G01C 21/28
701/32.2
5,999,877 A * 12/1999 Takahashi .......... G06K 9/00785
701/117

(Continued)

FOREIGN PATENT DOCUMENTS

| JP | 2007317285 A | 12/2007 |
|---|---|---|
| JP | 2009-60477 A | 3/2009 |

(Continued)

OTHER PUBLICATIONS

Extended European Search Report from EP Application No. 17915969.4 dated May 18, 2020, 8 pages.

*Primary Examiner* — Mohammed R Uddin
(74) *Attorney, Agent, or Firm* — Brundidge & Stanger, P.C.

(57) ABSTRACT

A drive recorder operation system includes a drive recorder and an operation server. The drive recorder generates index information respectively corresponding to a plurality of video files, sends the index information to the operation server, and prohibits a video file from being overwritten based on an overwrite prohibition command from the operation server. The operation server receives an instruction designating index information and sends an overwrite prohibition command including the designated index information to the drive recorder.

5 Claims, 8 Drawing Sheets

(51) Int. Cl.
 *G07C 5/00* (2006.01)
 *G07C 5/04* (2006.01)

(56) References Cited

U.S. PATENT DOCUMENTS

| | | | | |
|---|---|---|---|---|
| 6,704,434 B1* | 3/2004 | Sakoh | ............... | B60R 1/00 340/933 |
| 10,984,275 B1* | 4/2021 | Campbell | ......... | G06K 9/00664 |
| 2002/0145666 A1* | 10/2002 | Scaman | ............... | G07C 5/085 348/148 |
| 2003/0210806 A1* | 11/2003 | Yoichi | ............... | G08G 1/20 382/104 |
| 2003/0212567 A1* | 11/2003 | Shintani | ............... | G06Q 99/00 725/105 |
| 2006/0092043 A1* | 5/2006 | Lagassey | ............ | G07C 5/0891 340/907 |
| 2007/0285512 A1* | 12/2007 | Kitani | ............... | H04N 7/18 348/148 |
| 2009/0148152 A1* | 6/2009 | Kurane | ............... | G03B 29/00 396/429 |
| 2009/0306848 A1* | 12/2009 | Kohsaka | ............ | G07C 5/085 701/31.4 |
| 2010/0039494 A1* | 2/2010 | Horihata | .............. | B60R 1/00 348/14.02 |
| 2010/0118150 A1* | 5/2010 | Boland | ............. | H04N 5/2259 348/207.1 |
| 2010/0174449 A1* | 7/2010 | Kim | .................. | G07C 5/0866 701/33.4 |
| 2011/0254676 A1* | 10/2011 | Marumoto | ............ | G07C 5/085 340/441 |
| 2013/0135472 A1* | 5/2013 | Wu | ..................... | G07C 5/0866 348/148 |
| 2013/0218460 A1* | 8/2013 | Kim | ................. | G08G 1/09626 701/461 |
| 2016/0006922 A1* | 1/2016 | Boudreau | ............ | H04N 7/185 348/207.1 |
| 2016/0009225 A1* | 1/2016 | Watanabe | ............. | B60R 11/04 348/148 |
| 2016/0189442 A1* | 6/2016 | Wright | ................. | G06F 17/00 701/33.2 |
| 2016/0350298 A1* | 12/2016 | Ono | .................... | G07C 5/0808 |

FOREIGN PATENT DOCUMENTS

JP  2016-118904 A  6/2016
WO  2015045545 A1  4/2015

\* cited by examiner

FIG.5

| DRIVE RECORDER IDENTIFICATION INFORMATION | INDEX INFORMATION | | |
|---|---|---|---|
| | LOCATION (LATITUDE, LONGITUDE) | DATE (YEAR, MONTH, DAY) | TIME (HOUR, MINUTE, SECOND) |
| 001 | LN101, LE101 | Y101, M101, D101 | H101, M101, S101 |
| | LN102, LE102 | Y101, M101, D101 | H102, M102, S102 |
| | LN103, LE103 | Y101, M101, D101 | H103, M103, S103 |
| | ... | ... | ... |
| | LN109, LE109 | Y101, M101, D101 | H109, M109, S109 |
| 002 | LN201, LE201 | Y201, M201, D201 | H201, M201, S201 |
| | LN202, LE202 | Y201, M201, D201 | H202, M202, S202 |
| | LN203, LE203 | Y201, M201, D201 | H203, M203, S203 |
| | ... | ... | ... |
| | LN209, LE209 | Y201, M201, D201 | H209, M209, S209 |
| ... | ... | ... | ... |

DRIVE RECORDER OPERATION SYSTEM, DRIVE RECORDER, OPERATION METHOD, AND RECORDING MEDIUM FOR OPERATION

CROSS-REFERENCE TO RELATED APPLICATION

Priority is claimed to Japanese Patent Application No. 2017-129464, filed on Jun. 30, 2017, the entire content of which is incorporated herein by reference.

BACKGROUND OF THE INVENTION

1. Field of the Invention

The present invention relates to a drive recorder operation system, a drive recorder, an operation method, and an recording medium for operating a drive recorder mounted on a vehicle.

2. Description of the Related Art

A drive recorder mounted on a vehicle captures images of the neighborhood of the vehicle (e.g., the scenery in front of the vehicle) in time sequence and records a video. The drive recorder saves the captured video in a recording medium. Due to the limitation on the capacity of the recording medium, however, a plurality of video files are saved over a certain period of time, and then old video files are sequentially overwritten in the chronological order to save new videos.

Patent document 1 discloses a drive recorder operation system including a drive recorder and an operation server. The drive recorder transmits a situation file to a server device, the situation file including a video file concurrent with a large acceleration, the acceleration etc. When the operation server determines that overwriting of the transmitted view should be absolutely prohibited, the operation server transmits a command (overwrite prohibition command) to prohibit the drive recorder from overwriting. The drive recorder absolutely prohibits the video file designated by the overwrite prohibition command from being overwritten.

[patent document 1] JP2016-224677

SUMMARY OF THE INVENTION

In the drive recorder operation system disclosed in cited document 1, overwriting of a video file saved in the drive recorder concurrent with a large acceleration is prohibited. However, a server device cannot request prohibiting an arbitrary video file from being overwritten.

For example, there are cases in which a video captured by a drive recorder is used for enjoyment, or a video showing a situation that occurred at a particular location and point of time may be used for the purpose of checking. With these requirements in the background, the convenience can be increased by allowing the operation server to prohibit an arbitrary video file saved in the drive recorder from being overwritten.

The present invention addresses the above-described issue, and a general purpose thereof is to provide a drive recorder operation system, a drive recorder, an operation method, and an recording medium for operation capable of allowing the operation server to prohibit a video file saved in the drive recorder from being overwritten and improving the convenience accordingly.

A drive recorder operation system according to an embodiment includes: a drive recorder that captures images of a neighborhood of a vehicle in time sequence and that generates and records a plurality of video files; and an operation server that is communicably connected to the drive recorder, wherein the drive recorder generates index information respectively corresponding to the plurality of video files, sends the index information to the operation server, the operation server receives an instruction designating index information and sends an overwrite prohibition command including the designated index information to the drive recorder, and the drive recorder prohibits a video file from being overwritten based on the overwrite prohibition command from the operation server.

Another embodiment of the present invention relates to a drive recorder. The drive recorder includes: an imaging unit that captures images of a neighborhood of a vehicle in time sequence; a recording medium that adds index information including corresponding location, date, and time to a plurality of video files generated and saves the video files; an index information processing unit that sends the index information to an operation server that is communicably connected; and an overwrite prohibition processing unit that prohibits a video file from being overwritten based on an overwrite prohibition command acquired from the operation server and including the index information.

Still another embodiment of the present invention relates to an operation method. The operation method includes: capturing images of a neighborhood of a vehicle in time sequence; adding index information including corresponding location, date, and time to a plurality of video files generated and saving the video files; sending the index information to an operation server that is communicably connected; and prohibiting a video file from being overwritten based on an overwrite prohibition command acquired from the operation server and including the index information.

Optional combinations of the aforementioned constituting elements, and implementations of the embodiments in the form of methods, apparatuses, systems, recording mediums, and computer programs may also be practiced as additional modes of the embodiments.

BRIEF DESCRIPTION OF DRAWINGS

Embodiments will now be described by way of examples only, with reference to the accompanying drawings which are meant to be exemplary, not limiting and wherein like elements are numbered alike in several Figures in which:

FIG. 5 is a chart showing an example of index information stored in the index information storage unit;

DETAILED DESCRIPTION OF THE PREFERRED EMBODIMENT

Figure 1:
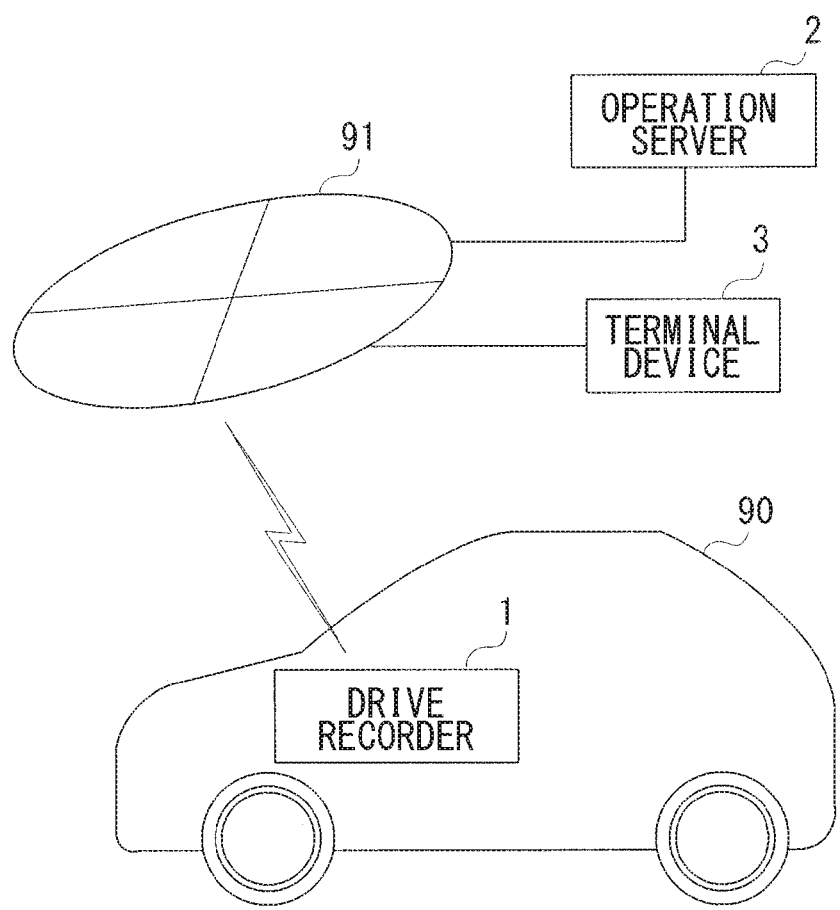
FIG. 1 is a schematic diagram to illustrate communication connection in a drive recorder operation system according to the embodiment.

The invention will now be described by reference to the preferred embodiments. This does not intend to limit the scope of the present invention, but to exemplify the invention.

Hereinafter, the embodiments will be described based on suitable embodiments with reference to FIGS. 1 through 8. Identical or like constituting elements and members shown in the drawings are represented by identical symbols and a duplicate description is omitted. The dimension of members in the drawings shall be enlarged or reduced as appropriate to facilitate understanding. Those of the members that are not material to the description of the embodiments are omitted in the drawings.

Embodiment

FIG. 1 is a schematic diagram to illustrate communication connection in a drive recorder operation system 100 according to the embodiment. The drive recorder operation system 100 includes a drive recorder 1 and an operation server 2. Of a plurality of video files saved in the drive recorder 1, the user of the drive recorder operation system 100 designates a video file that should be prohibited from being overwritten. Overwriting of the file is prohibited by an overwrite prohibition command from the operation server 2.

The drive recorder 1 is mounted on a vehicle 90 and captures images of the neighborhood of the vehicle (e.g., the scenery in front of the vehicle 90) in time sequence and records a video. The drive recorder 1 saves the captured video in a recording medium. Due to the limitation on the capacity of the recording medium, however, a plurality of video files are saved over a certain period of time, and then old video files are sequentially overwritten in the chronological order to record new videos.

The drive recorder 1 communicates with the operation server 2 via a communication network 91. The drive recorder 1 according to the invention sends index information such as the location, date, and time of the saved video file to the operation server 2. The drive recorder 1 acquires an overwrite prohibition command from the operation server 2 and prohibits the relevant video file from being overwritten. The operation server 2 provides an environment to display the index information and select a video file that should be prohibited from being overwritten according to the user's instruction. Display of the index information and user operation input may be performed in the operation server 2 but may be performed in a terminal device 3 connected to the communication network 91.

Figure 2:
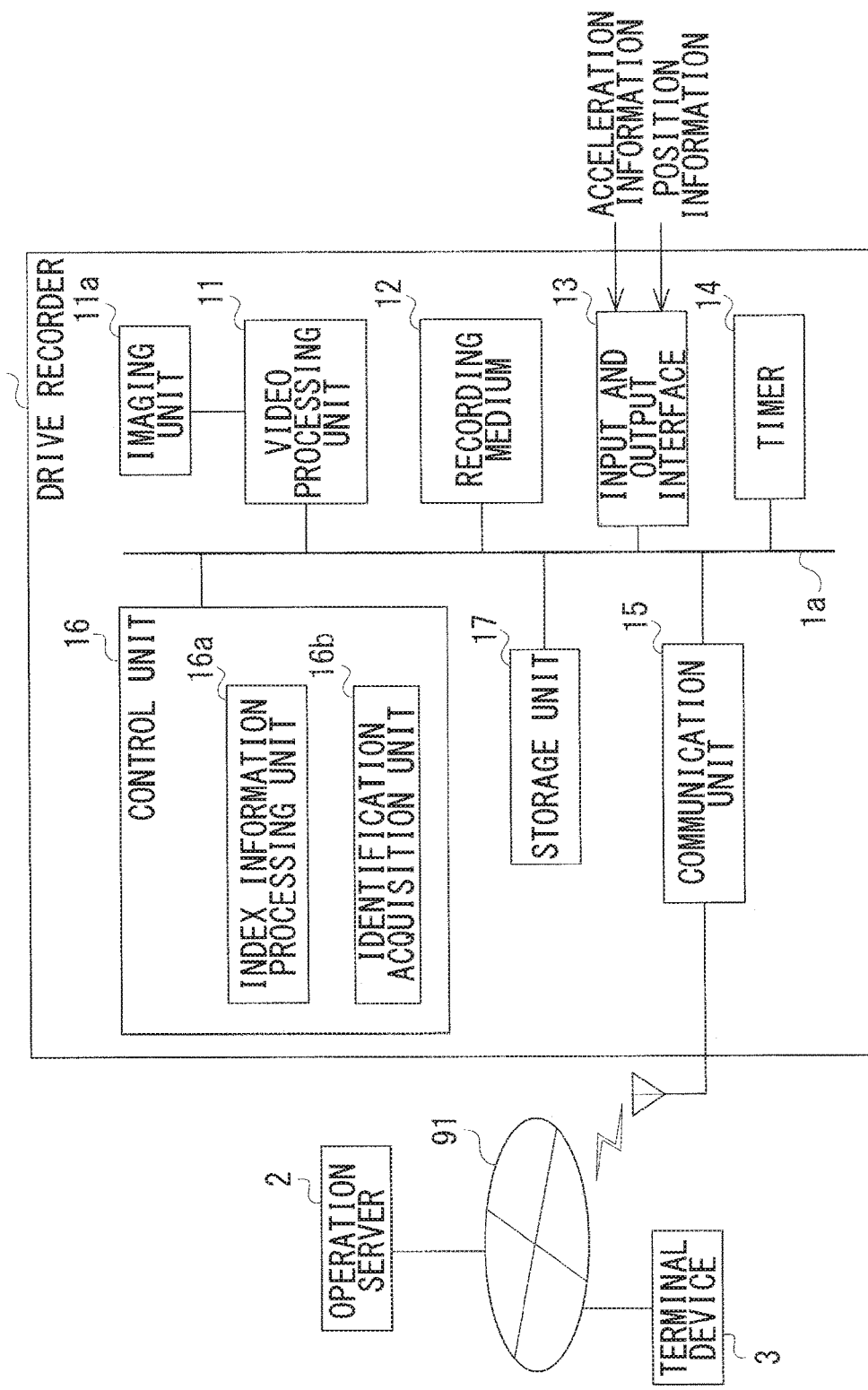
FIG. 2 is a block diagram showing a configuration of the drive recorder according to the embodiment.
Figure 3:
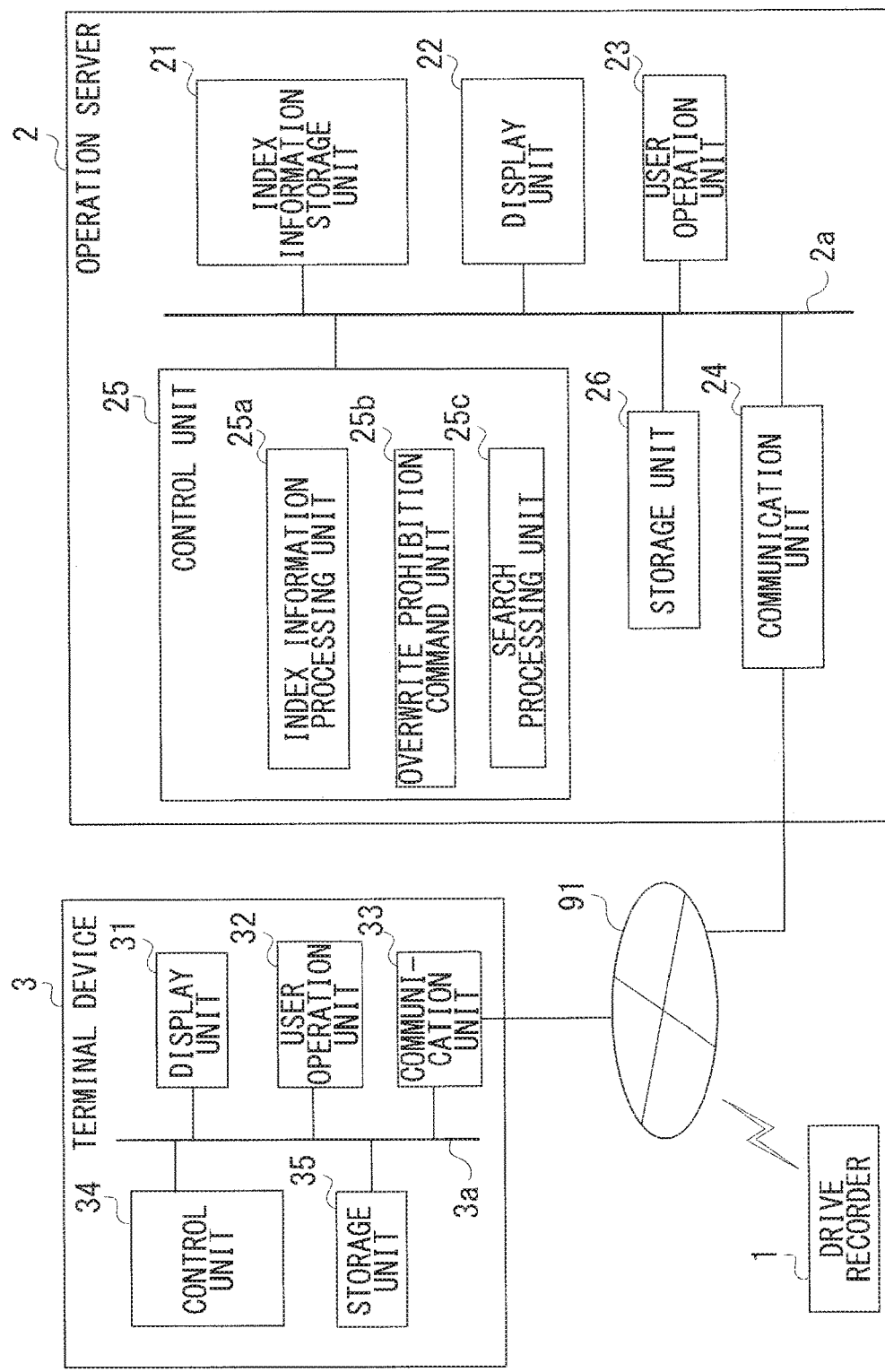
FIG. 3 is block diagram showing a configuration of the operation server and the terminal device according to the embodiment.

FIG. 2 is a block diagram showing a configuration of the drive recorder 1 according to the embodiment, and FIG. 3 is block diagram showing a configuration of the operation server 2 and the terminal device 3 according to the embodiment. The drive recorder 1 includes a video processing unit 11, a recording medium 12, an input and output interface 13, a timer 14, a communication unit 15, a control unit 16, and a storage unit 17. The video processing unit 11, the recording medium 12, the input and output interface 13, the timer 14, the communication unit 15, the control unit 16, and the storage unit 17 are connected by a data bus 1a to exchange electrical signals mutually.

The video processing unit 11 processes (e.g., compresses data for) a video signal captured by an imaging unit 11a and covering a certain time duration and adds index information to the video signal to generate a video file. The video processing unit 11 saves the generated video file in the recording medium 12. The index information includes the location, date, and time and also includes the condition (e.g., acceleration) of the vehicle. For example, the imaging unit 11a includes a detector such as a CCD and images the neighborhood of the vehicle 90 (e.g., the scenery in front of the vehicle 90). The imaging unit 11a acquires images in time sequence and sends the video signal to the video processing unit 11.

For example, the recording medium 12 is an SD card, a USB memory etc. and is configured to save or delete the video file generated by the video processing unit 11. By configuring the recording medium 12 to be removably connected to the drive recorder 1, one can remove it from the drive recorder 1 to play back a video on a PC etc.

Figure 4:
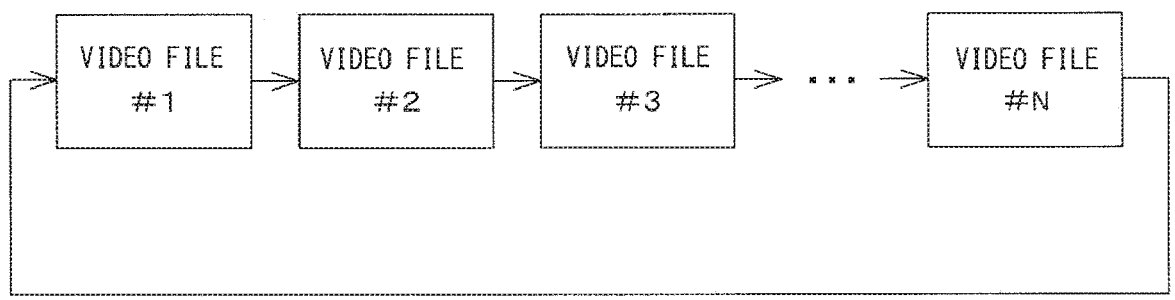
FIG. 4 is a schematic diagram for illustrating continuous recording in the recording medium.

FIG. 4 is a schematic diagram for illustrating continuous recording in the recording medium 12. Video files generated by the video processing unit 11 are sequentially saved in the recording medium 12 as video files #1, #2, . . . , #N. Since there is a limitation to the capacity of the recording medium 12, a plurality of video files are saved over a certain period of time, and then old video files are deleted and overwritten, beginning with the video file #1, to save new videos.

The input and output interface 13 acquires acceleration information, position information on the vehicle 90 etc. from an external device. The drive recorder 1 may have a built-in sensor for measuring acceleration. The timer 14 measures the date and time. The acceleration, position information etc. acquired by the input and output interface 13 and the date and time acquired by the timer 14 are added to the video file as index information. The input and output interface 13 acquires, as position information, the latitude and longitude information, and a name of place, an address etc. acquired by finding a match on a map. Information on a location included in the index information may be a name of place, an address etc. as well as the latitude and longitude information acquired from the input and output interface 13. Position information such as a name of place and an address may be acquired by a navigation device etc. and input to the input and output interface 13. Alternatively, information on a location included in the index information may be the latitude and longitude information etc. obtained by building a GPS function in the drive recorder 1.

The communication unit 15 performs wireless communication with the communication network 91 in compliance with the communication standard of WiFi (registered trademark) etc. and communicates with the operation server 2 via the communication network 91. The communication unit 15 transmits and receives radio signal waves by an antenna connected to the communication unit 15 and communicates wirelessly with the communication network 91. In case an subscriber identify module (SIM) card for a cellular communication network is mounted, the communication unit 15 may use the cellular communication network for communication.

The control unit 16 includes an index information processing unit 16a and an overwrite prohibition processing unit 16b. For example, the control unit 16 is comprised of a CPU and performs the processes in the respective units by being operated in accordance with a computer program. The storage unit 17 is comprised of a data storage device such as a random access memory (RAM), a flash memory, and a hard disk storage device and stores a computer program etc. executed in the control unit 16.

In the control unit 16, the index information processing unit 16a generates index information corresponding to each video file. The index information processing unit 16a sends the index information added to the video file from the communication unit 15 to the operation server 2 along with the identification information. The point of time when the index information processing unit 16a sends the index information to the operation server 2 may be any time during a power off sequence in which the drive recorder 1 is turned on, the video processing unit 11 saves the video file in the recording medium 12, and the drive recorder 1 is turned off. Alternatively, the index information processing unit 16a may periodically send the index information to the operation server 2. The identification information may be any information capable of discriminating the drive recorder 1 from drive recorders mounted on other vehicles.

The overwrite prohibition processing unit 16b receives and acquires the overwrite prohibition command from the operation server 2 via the communication unit 15. The overwrite prohibition processing unit 16b prohibits a video file saved in the recording medium 12 from being overwritten based on the index information related to the location, date, and time included in the acquired overwrite prohibition command. This prevents the video processing unit 11 from deleting or overwriting the video file designated as being prohibited from being overwritten.

A description will now be given of the operation server 2 and the terminal device 3 with reference to FIG. 3. The operation server 2 includes an index information storage unit 21, a display unit 22, a user operation unit 23, a communication unit 24, a control unit 25, and a storage unit 26. The index information storage unit 21, the display unit 22, the user operation unit 23, the communication unit 24, the control unit 25, and the storage unit 26 are connected by a data bus 2a to exchange electrical signals mutually.

The index information storage unit 21 acquires the index information sent from the drive recorder 1 via the communication unit 24 and stores the index information, by associating with the identification information of the drive recorder. FIG. 5 is a chart showing an example of index information stored in the index information storage unit 21. Just as the video file is overwritten in the drive recorder 1, the index information storage unit 21 overwrites and records the index information stored in the past, based on the index information sent from the drive recorder 1.

The display unit 22 is comprised of a liquid crystal display, an organic electro luminescence (EL) display, a light emitting diode (LED) display etc. The display unit 22 displays information related to user operation etc. based on a command from the control unit 25. The user operation unit 23 is comprised of a control key, a directional key, and a switch such as a touch panel and receives a user operation input. The user operation input received by the user operation unit 23 is acquired by the control unit 25. The user operation input in response to the index information is received in the terminal device 3 connected to the communication network 91, where the index information is displayed. Alternatively, the user operation input may be received by the user operation unit 23 of the operation server 2. In addition to user operation inputs, the user operation unit 23 may be compatible with inputs by other means such as speech input. The user operation unit 23 receives an instruction from the user, and the user operation input by the user represents an instruction from the user.

The communication unit 24 is communicably connected to the communication network 91 wirelessly or by wire. The communication unit 24 communicates with the communication unit 15 of the drive recorder 1 via the communication network 91.

The control unit 25 includes an index information processing unit 25a, an overwrite prohibition command unit 25b, and a search processing unit 25c. For example, the control unit 25 is comprised of a CPU and performs the processes in the respective units by being operated in accordance with a computer program. The storage unit 26 is comprised of a data storage device such as a RAM, a flash memory, and a hard disk storage device and stores a computer program etc. executed in the control unit 25.

In the control unit 25, the index information processing unit 25a acquires the index information sent from the drive recorder 1 via the communication unit 24 and stores the index information in the index information storage unit 21, by associating with the identification information of the drive recorder 1.

The overwrite prohibition command unit 25b acquires designation of index information for which overwriting is prohibited, in the form of a user operation input in the terminal device 3. The overwrite prohibition command unit 25b may acquire designation of index information for which overwriting is prohibited, in the form of a user operation input in the user operation unit 23 in response to the index information displayed on the display unit 22. The overwrite prohibition command unit 25b generates an overwrite prohibition command including the designated index information and sends the command to the drive recorder 1 via the communication unit 24.

The search processing unit 25c searches the index information stored in the index information storage unit 21 for the relevant index information, using a search key such as location, date and time. The search processing unit 25c may search one drive recorder 1 or may search a plurality of or all drive recorders 1 recorded in the index information storage unit 21. The index information extracted by the search processing unit 25c is displayed in the terminal device 3, allowing the user operation input in the terminal device 3 to select the index information for which overwriting is prohibited. The index information extracted by the search processing unit 25c may be displayed on the display unit 22, and the index information for which overwriting is prohibited may be selected by the user operation input in the user operation unit 23. The overwrite prohibition command unit 25b generates an overwrite prohibition command corresponding to the index information selected by the user operation input and sends the command to the drive recorders 1 from the communication unit 24.

The terminal device 3 includes a display unit 31, a user operation unit 32, a communication unit 33, a control unit 34, a storage unit 35 etc. For example, the terminal device 3 is an information processing terminal such as a personal computer (PC) and a smartphone and is communicably connected to the operation server 2 via the communication network 91. Alternatively, the terminal device 3 may be communicably connected to the operation server 2 by a local area network. The display unit 31, the user operation unit 32, the communication unit 33, the control unit 34, the storage unit 35, etc. are connected by a data bus 3a to exchange electrical signals mutually.

The display unit 31 is comprised of a liquid crystal display, an organic EL display, an LED display etc. The display unit 31 displays information related to user operation etc. based on a command from the control unit 34. The user operation unit 32 is comprised of a control key, a directional key, and a switch such as a touch panel and receives a user operation input. The user operation input received by the user operation unit 32 is acquired by the control unit 34. In addition to user operation inputs, the user operation unit 32 may be compatible with inputs by other means such as speech input. The user operation unit 32 receives an instruction from the user, and the user operation input by the user represents an instruction from the user.

The communication unit 33 is communicably connected to the communication network 91 wirelessly or by wire. The communication unit 33 communicates with the communication unit 24 of the operation server 2 via the communication network 91. The communication unit 33 may use wireless communication such as a WiFi communication circuit and a cellular communication circuit.

For example, the control unit 34 is comprised of a CPU and is operated in accordance with a computer program. The storage unit 35 is comprised of a data storage device such as a RAM, a flash memory, and a hard disk storage device and stores a computer program etc. executed in the control unit 34.

The control unit 34 causes the display unit 31 to display the index information of the drive recorder 1 stored in the operation server 2 and acquires, from the user operation unit 32, a user operation input designating the index information for which overwriting is prohibited. The control unit 34 sends the acquired index information for which overwriting is prohibited to the operation server 2 via the communication unit 33.

Further, the control unit 34 causes the display unit 31 to display a search screen for searching the index information of the drive recorder 1 stored in the operation server 2 and acquires a user operation input such as a search key from the user operation unit 32. The control unit 34 sends the acquired search key to the operation server 2 via the communication unit 33, acquires the index information extracted in the operation server 2, displays the acquired index information on the display unit 31, and acquires, from the user operation unit 32, a user operation input designating the index information for which overwriting is prohibited. The control unit 34 sends the acquired index information for which overwriting is prohibited to the operation server 2 via the communication unit 33.

Figure 6:
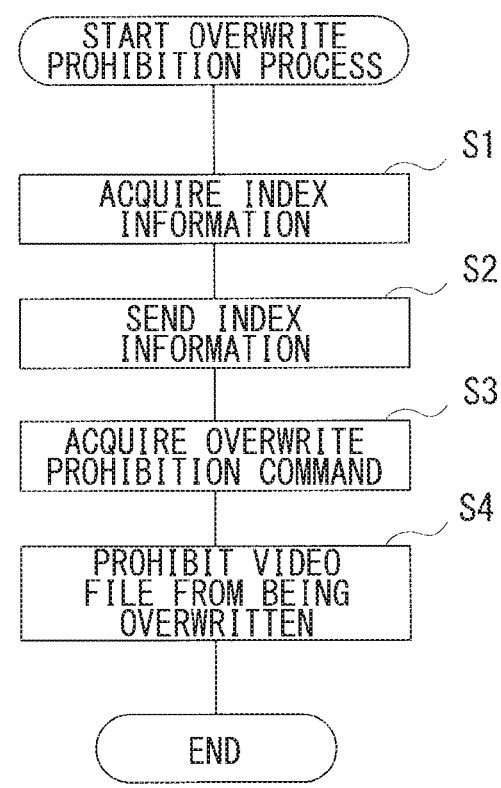
FIG. 6 is a flowchart showing a sequence of steps in the overwrite prohibition process in the drive recorder.

A description will now be given of the operation of the drive recorder operation system 100, based on the overwrite prohibition process in the drive recorder 1 and the overwrite prohibition command process in the operation server 2. FIG. 6 is a flowchart showing a sequence of steps in the overwrite prohibition process in the drive recorder 1. The drive recorder 1 generates a video file in the video processing unit 11 based on a video captured by the imaging unit 11a and saves the video file in the recording medium 12, adding index information to the video file. The index information processing unit 16a of the control unit 16 acquires the index information of each video file saved in the recording medium 12 (S1) and sends the acquired index information from the communication unit 15 to the operation server 2 (S2).

The overwrite prohibition processing unit 16b of the control unit 16 acquires the overwrite prohibition command sent from the operation server 2 by receiving it in the communication unit 15 (S3). The overwrite prohibition processing unit 16b prohibits the relevant video file from being overwritten based on the index information included in the overwrite prohibition command (S4).

Figure 7:
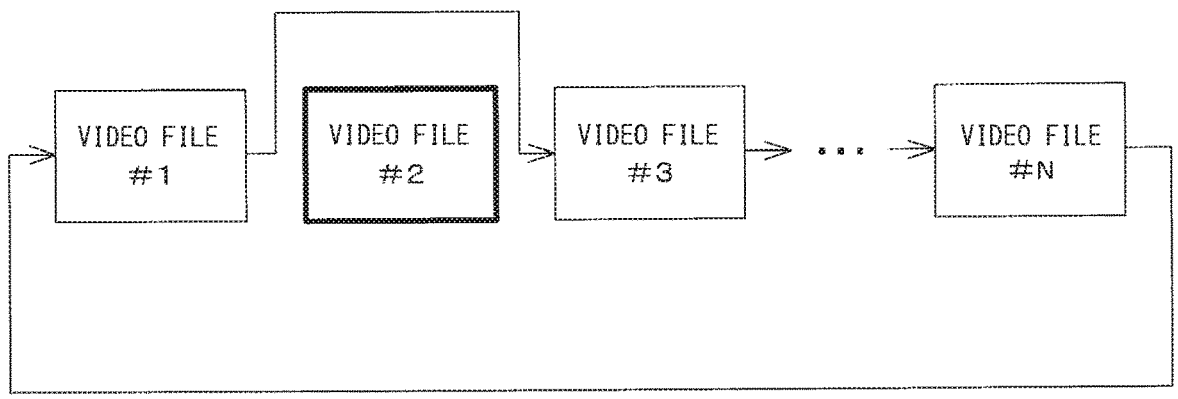
FIG. 7 is a schematic diagram illustrating continuous recording in the recording medium performed when overwriting of a video file is prohibited.

FIG. 7 is a schematic diagram illustrating continuous recording in the recording medium 12 performed when overwriting of a video file is prohibited. The video processing unit 11 saves a plurality of video files over a certain period of time, and then sequentially overwrites old video files in the chronological order to save new videos, skipping the video file prohibited from being overwritten (video file #2). The video file prohibited from being overwritten (video file #2) is saved in the recording medium 12 without being deleted or overwritten. The user can use the file by, for example, connecting the recording medium 12 to a PC etc.

Figure 8:
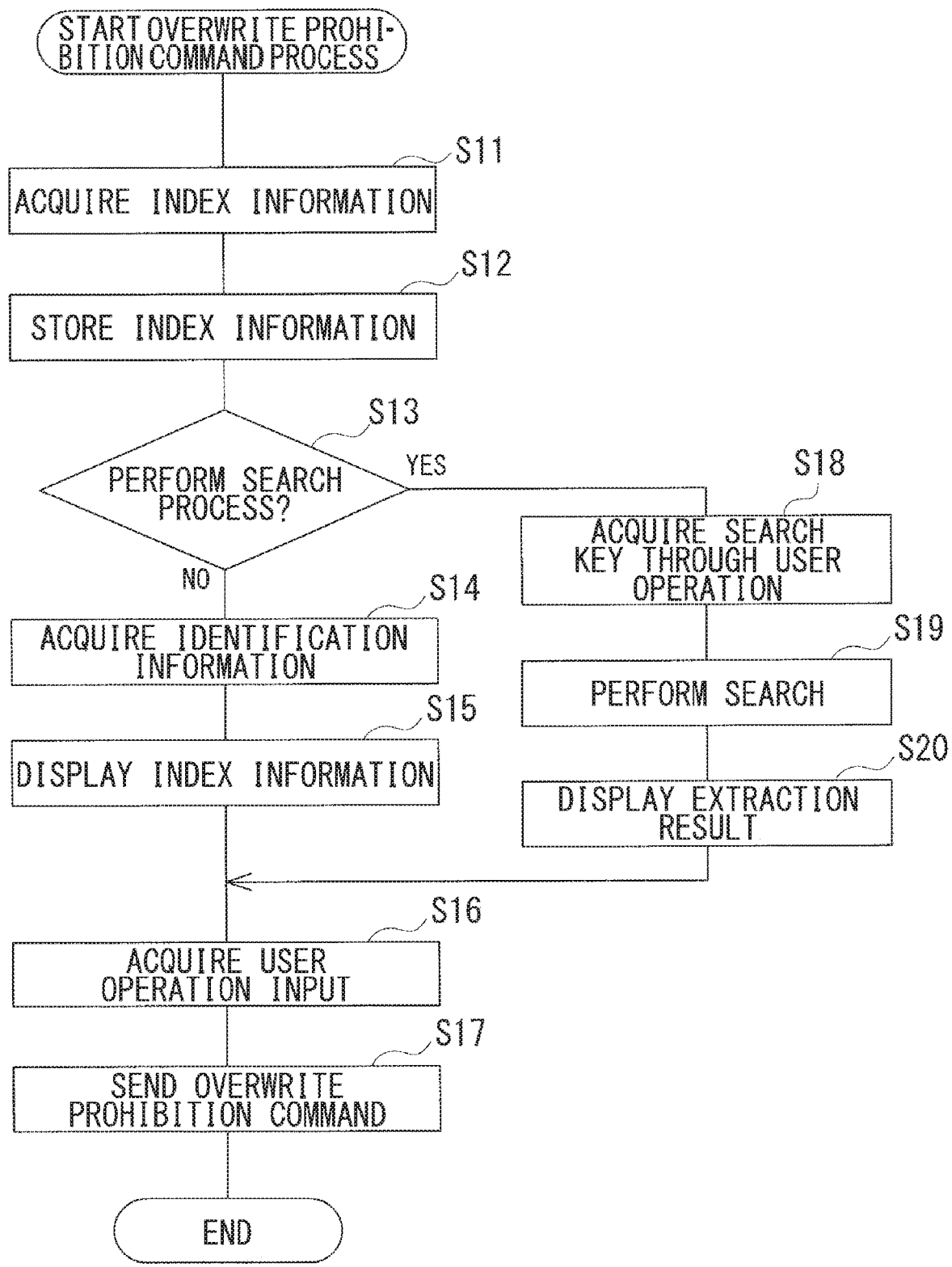
FIG. 8 is a flowchart showing a sequence of steps of the overwrite prohibition command process in the operation server and the terminal device.

FIG. 8 is a flowchart showing a sequence of steps of the overwrite prohibition command process in the operation server 2 and the terminal device 3. The index information processing unit 25a of the control unit 25 in the operation server 2 acquires the index information sent from the drive recorder 1 (S11) and stores the index information in the index information storage unit 21 (S12). The control unit 34 of the terminal device 3 displays a screen to let the user select whether to perform a search process on the display unit 31. The control unit 34 acquires a user operation input in the user operation unit 32 to determine whether to perform a search process or not (S13).

When the control unit 34 of the terminal device 3 determines not to perform a search process in step S13 (S13: NO), the control unit 34 acquires the identification information of the drive recorder 1 targeted in the process, based on the user operation input in the user operation unit 32 (S14). The control unit 34 inquires the operation server 2 for the index information corresponding to the acquired identification information, acquires the index information stored in the index information storage unit 21 from the operation server 2, and displays the acquired index information on the display unit 31 (S15). The control unit 34 may display information of the location included in the index information on the display unit 31, overlapping the information on map data.

The control unit 34 of the terminal device 3 acquires the user operation input by the user manipulating the user operation unit 32 to designate the index information for which overwriting is prohibited (S16). The control unit 34 sends the index information for which prohibition of overwriting is designated to the operation server 2 via the communication unit 33. The overwrite prohibition command unit 25b of the control unit 25 in the operation server 2 acquires, via the communication unit 24, the index information sent from the terminal device 3 for which prohibition of overwriting is designated. The overwrite prohibition command unit 25b generates an overwrite prohibition command including the index information for which prohibition of overwriting is designated, sends the overwrite prohibition command to the drive recorder 1 corresponding to the identification information (S17), and terminates the process.

When the control unit 34 of the terminal device 3 determines to perform a search process in S13 (S13: YES), the control unit 34 displays a search screen for entering a search key etc. on the display unit 31 and acquires a user operation input from the user operation unit 32. The control unit 34 acquires the search key in the form of the user operation input (S18) and sends search information such as the search key to the operation server 2 via the communication unit 33. The search processing unit 25c of the control unit 25 in the operation server 2 searches the index information stored in the index information storage unit 21, based on the search information, such as the search key, acquired from the terminal device 3 via the communication unit 24 (S19). The search key may be a particular location or a range including a particular location, a particular date and time, a range including a particular date and time etc.

The search processing unit 25c sends a result of extraction of the index information obtained by performing the search based on the search key to the terminal device 3 via the communication unit 24. The control unit 34 of the terminal device 3 displays the index information acquired from the operation server 2 via the communication unit 33 on the display unit 31 (S20) and makes a transition to step S16. The control unit 34 acquires a user operation input designating the index information for which overwriting is prohibited in step S16. The overwrite prohibition command unit 25b of the control unit 25 in the operation server 2 generates the overwrite prohibition command in step S17, sends the overwrite prohibition command to the drive recorder 1, and terminates the process.

In the drive recorder operation system 100, the user can designate the video file prohibited from being overwritten based on the index information stored in the operation server 2. When the video captured by the drive recorder 1 is used for enjoyment, the user can designate a video file prohibited from being overwritten, based on the index information such as the location, date, time etc. so that the convenience of the drive recorder 1 is improved.

When a traffic accident, an incident etc. occurs, the police can cause the operation server 2 to prohibit overwriting, and the drive recorder 1 can prohibit a video file from being overwritten based on the overwrite prohibition command sent from the operation server 2. Accordingly, the drive recorder operation system 100 is applicable to preservation and perpetuation of evidence in a traffic accident, an incident etc. The drive recorder operation system 100 is also applicable to vehicle management, etc. wherein a taxi company or a trucking company causes the system to prohibit a record in the drive recorder 1 mounted on a vehicle subject to management from being overwritten.

The drive recorder operation system 100 can also be used for the purpose of using a video to study a situation that occurred at a particular location, date, and time, based on the index information provided from a plurality of drive recorders 1. The operation server 2 stores the index information from the plurality of drive recorders 1 in the index information storage unit 21. The operation server 2 uses the search processing unit 25c to perform a search using a particular location, date, and time, or a range thereof as a search key so as to extract the index information of the plurality of drive recorders 1. The drive recorder operation system 100 can secure a video file corresponding to a particular location, date, and time in the plurality of drive recorders 1, by prohibiting a video file corresponding to the extracted index information from being overwritten. Accordingly, the convenience is further improved.

A description will now be given of characteristics of the drive recorder operation system 100, the drive recorder 1, the operation method, and the recording medium for operation according to the embodiment. The drive recorder operation system 100 according to the embodiment includes: the drive recorder 1 that captures images of the neighborhood of the vehicle 90 in time sequence and that generates and records a plurality of video files; and the operation server 2 communicably connected to the drive recorder 1. The drive recorder 1 generates index information respectively corresponding to the plurality of video files, sends the index information to the operation server 2, and prohibits a video file from being overwritten based on an overwrite prohibition command from the operation server 2. The operation server 2 receives a command (user operation input) designating the index information and sends the overwrite prohibition command including the designated index information to the drive recorder 1. Thus, the operation server 2 designates a video file prohibited from being overwritten based on the index information to prohibit the video file saved in the drive recorder 1 from being overwritten. Accordingly, the drive recorder operation system 100 improves user convenience.

Further, by including the location, date, and time in the index information, the user can designate a video file prohibited from being overwritten, based on the location, date, and time. Accordingly, user convenience is improved.

Further, the operation server 2 acquires the index information from a plurality of drive recorders 1 and performs a search process based on the acquired index information. This allows the drive recorder operation system 100 to secure the video file that matches the search condition in the plurality of drive recorders 1 so that the convenience is further improved.

The drive recorder 1 according to the embodiment includes: the imaging unit 11a that captures images of the neighborhood of the vehicle 90 in time sequence; and the recording medium 12 that adds corresponding index information to a plurality of video files generated and saves the resultant video files. The drive recorder 1 includes: the index information processing unit 16a that sends the index information to the external operation server 2; and the overwrite prohibition processing unit 16b that prohibits a video file from being overwritten based on an overwrite prohibition command acquired from the operation server 2 and including the index information. This allows the drive recorder 1 to prohibit the video file from being overwritten in accordance with the overwrite prohibition command designated by the operation server 2 so that user convenience is improved.

The operation method according to the embodiment includes: capturing images of the neighborhood of the vehicle 90 in time sequence; and adding corresponding index information to a plurality of video files generated and saving the video files. The operation method includes: sending the index information to an external operation server 2; and prohibiting a video file from being overwritten based on an overwrite prohibition command acquired from the operation server 2 and including the index information. According to the operation method, a video file saved in the drive recorder 1 is prohibited from being overwritten based on an overwrite prohibition command designated in the operation server 2. Accordingly, user convenience is improved.

A non-transitory recording medium for operation according to the embodiment encoded with a program, the program comprising computer-implemented modules including: a module that captures images of the neighborhood of the vehicle 90 in time sequence; and a module that adds index information including corresponding location, date, and time to a plurality of video files generated and saving the video files. The operation program includes computer-implemented modules including: a module that sends the index information to an operation server 2 that is communicably connected; and a module that prohibits a video file from being overwritten based on an overwrite prohibition command acquired from the operation server 2 and including the index information. According to the recording medium, a video file saved in the drive recorder 1 is prohibited from being overwritten based on an overwrite prohibition command designated in the operation server 2. Accordingly, user convenience is improved.

Described above is an explanation based on an exemplary embodiment. The embodiments are intended to be illustrative only and it will be understood to those skilled in the art that variations and modifications are possible within the claim scope of the present invention and that such variations and modifications are also within the claim scope of the present invention. Therefore, the description in this specification and the drawings shall be treated to serve illustrative purposes and shall not limit the scope of the invention.

What is claimed is:

1. A drive recorder operation system, comprising:
    a drive recorder that captures images of a neighborhood of a vehicle in time sequence, designates a video file to be prohibited from being overwritten, and generates and records a plurality of video files; and
    an operation server that is communicably connected to the drive recorder, wherein
    the drive recorder generates index information including corresponding location, date, and time respectively corresponding to the plurality of video files, and sends the index information to the operation server,
    the operation server receives an instruction designating index information based on location, date, and time, and the designation of the video file to be prohibited from being overwritten, and generates an overwrite prohibition command including the designated index information of the video file to be prohibited from being overwritten, and sends the overwrite prohibition command to the drive recorder, and
    the drive recorder prohibits the video file from being overwritten based on the overwrite prohibition command from the operation server.

2. The drive recorder operation system according to claim 1, wherein
    the operation server acquires the index information from a plurality of drive recorders and prohibits a video file from being overwritten on the plurality of drive recorders.

3. A drive recorder comprising:
    an imaging unit that captures images of a neighborhood of a vehicle in time sequence;
    a recording medium that adds index information including corresponding location, date, and time to a plurality of video files generated and saves the video files;
    an index information processing unit that sends the index information to an operation server that is communicably connected; and
    an overwrite prohibition processing unit that acquires an overwrite prohibition command from the operation server, including the designated index information based on location, date, and time by the operation server, and prohibits a video file from being overwritten based on the overwrite prohibition command.

4. An operation method comprising:
    capturing images of a neighborhood of a vehicle in time sequence;
    adding index information including corresponding location, date, and time to a plurality of video files generated and saving the video files;
    sending the index information to an operation server that is communicably connected;
    acquiring an overwrite prohibition command from the operation server, including the designated index information based on location, date, and time by the operation server; and
    prohibiting a video file from being overwritten based on the overwrite prohibition command.

5. A non-transitory recording medium encoded with a program, the program comprising computer-implemented modules including:
    a module that capturing images of a neighborhood of a vehicle in time sequence;
    a module that adds index information including corresponding location, date, and time to a plurality of video files generated and saves the video files;
    a module that sends the index information to an operation server that is communicably connected;
    a module that acquires an overwrite prohibition command from the operation server, including the designated index information based on location, date, and time by the operation server; and
    a module that prohibits a video file from being overwritten based on the overwrite prohibition command.

* * * * *